(12) United States Patent
Shiomiya

(10) Patent No.: US 7,219,943 B2
(45) Date of Patent: May 22, 2007

(54) REMOTE CONTROL UNIT STORAGE DEVICE

(75) Inventor: Ken Shiomiya, Utsunomiya (JP)

(73) Assignee: Nifco Inc., Yokohama (JP)

( * ) Notice: Subject to any disclaimer, the term of this patent is extended or adjusted under 35 U.S.C. 154(b) by 44 days.

(21) Appl. No.: 11/105,542

(22) Filed: Apr. 14, 2005

(65) Prior Publication Data
US 2005/0236857 A1 Oct. 27, 2005

(30) Foreign Application Priority Data
Apr. 19, 2004 (JP) ............... 2004-123374

(51) Int. Cl.
*H05K 7/14* (2006.01)
(52) U.S. Cl. ............ 296/37.7; 348/837; 361/681
(58) Field of Classification Search ............. 296/37.7; 348/837; 307/10.2; 381/681
See application file for complete search history.

(56) References Cited

U.S. PATENT DOCUMENTS

| | | | |
|---|---|---|---|
| 6,530,547 B1 * | 3/2003 | Wada ................ | 248/286.1 |
| 7,084,932 B1 * | 8/2006 | Mathias et al. ........... | 348/837 |
| 2002/0005917 A1 * | 1/2002 | Rosen ................ | 348/837 |
| 2002/0021279 A1 * | 2/2002 | Nakasuna ............ | 345/156 |
| 2002/0085129 A1 * | 7/2002 | Kitazawa ............. | 348/837 |
| 2002/0163215 A1 * | 11/2002 | Emerling et al. ........ | 296/24.1 |

FOREIGN PATENT DOCUMENTS

JP 2003-189978 * 7/2003

* cited by examiner

*Primary Examiner*—Dennis H. Pedder
*Assistant Examiner*—Michael Hernandez
(74) *Attorney, Agent, or Firm*—Manabu Kanesaka

(57) ABSTRACT

A control unit storage device includes a storage member having a recess portion for retaining a control unit, an engaging and releasing unit attached to the storage member, and a supporting unit formed in the storage member. The engaging and releasing unit engages one end of the control unit and releases the one end from an engagement state. The supporting unit supports the other end of the control unit, so that the control unit does not fall off the recess portion when the engaging and releasing unit releases the one end of the remote control unit from the engagement state.

8 Claims, 5 Drawing Sheets

REMOTE CONTROL UNIT STORAGE DEVICE

BACKGROUND OF THE INVENTION AND RELATED ART STATEMENT

The present invention relates to a remote control unit storage device for storing a remote control unit remotely controlling a TV monitor installed in an automobile compartment.

An automobile may be provided with a TV monitor in a compartment thereof, and a remote control unit is used for controlling the TV monitor from a distance. The remote control unit may be stored and fixed in a storage device formed of a recess portion formed in a seatback of a front seat (see Patent Reference 1).

Patent Reference 1: Japanese Patent Publication (Kokai) No. 2003-189978.

In the conventional storage device, a push button is pushed to remove the remote control unit from the seatback. When the storage device is disposed at a lower position of the seatback, an occupant may accidentally contact the remote control unit stored in the storage device, and the remote control unit may fall out.

In view of the problem described above, an object of the present invention is to provide a storage device in which an occupant does not accidentally contact a remote control unit stored therein.

Further objects and advantages of the invention will be apparent from the following description of the invention.

SUMMARY OF THE INVENTION

In order to achieve the objects described above, according to the present invention, a storage device includes a recess portion disposed in a ceiling of an automobile compartment for storing a remote control unit and having an opening facing downwardly; an engaging and releasing unit disposed in the recess portion for engaging one end of the remote control unit stored in the recess portion and releasing the remote control unit from an engagement state; and a supporting unit disposed in the recess portion for supporting the other end of the remote control unit, so that the remote control unit does not fall off the recess portion when the engaging and releasing unit releases the remote control unit from the engagement state.

According to the present invention, the supporting unit may include a pair of supporting holes disposed coaxially with the other end of the remote control unit, and a pair of supporting shafts disposed in the recess portion for inserting into the supporting holes. It is preferable that one of the supporting shafts is elastically urged in an axial direction, so that the one of the supporting shaft can move reciprocally and project. It is also preferable that the one of the supporting shafts has a pointed round end. The recess portion may be integrally formed with an overhead consol with a TV monitor.

In the present invention, the remote control unit is stored and fixed to the recess portion formed in the ceiling of the automobile compartment. Accordingly, when an occupant gets in the compartment, the occupant does not contact the remote control unit. It is possible to engage and release the one end of the remote control unit. When the one end of the remote control unit is released from the engagement state, the supporting unit supports the other end of the remote control unit, so that the remote control unit does not fall off. Accordingly, even when the occupant contacts the remote control unit and the remote control unit is released from the engagement state, the remote control unit does not fall off.

In the invention, the supporting unit includes the supporting shafts for inserting into the supporting holes disposed at the other end of the remote control unit. One of the supporting shafts is elastically urged in the axial direction, so that the one of the supporting shaft moves reciprocally and projects. Accordingly, when the one of the supporting shaft is moved against an urging force, it is possible to release the one of the supporting shafts from the supporting hole. As a result, it is easy to detach the remote control unit from the recess portion at the ceiling, thereby improving an operation.

In the invention, the recess portion is integrally formed with the overhead consol. Accordingly, it is not necessary to provide the recess portion in a separate member, thereby making it easy to install the storage device.

DETAILED DESCRIPTION OF PREFERRED EMBODIMENTS

Figure 1:
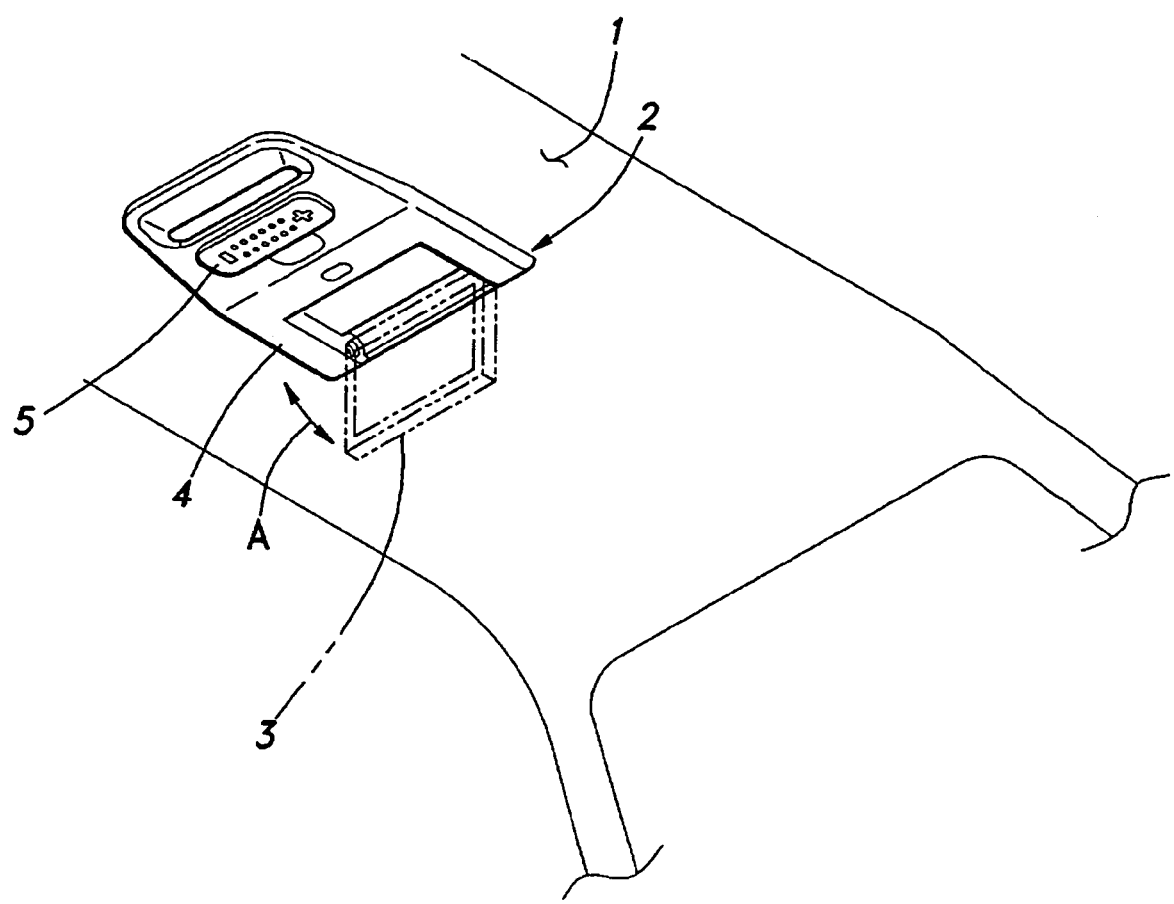
FIG. 1 is a perspective view showing a remote control unit storage device disposed in a ceiling of an automobile compartment according to an embodiment of the present invention.

Hereunder, embodiments of the present invention will be described with reference to the accompanying drawings. FIG. 1 is a perspective view showing a remote control unit storage device disposed in a ceiling of an automobile compartment according to an embodiment of the present invention. As shown in FIG. 1, a ceiling 1 of a compartment of a vehicle such as an automobile is provided with an overhead consol 2. A TV monitor 3 is supported in the overhead consol 2, so that the TV monitor 3 can swing indicated by an arrow A in FIG. 1 between a storage portion along the ceiling and a use position hung from the ceiling.

Figure 2:
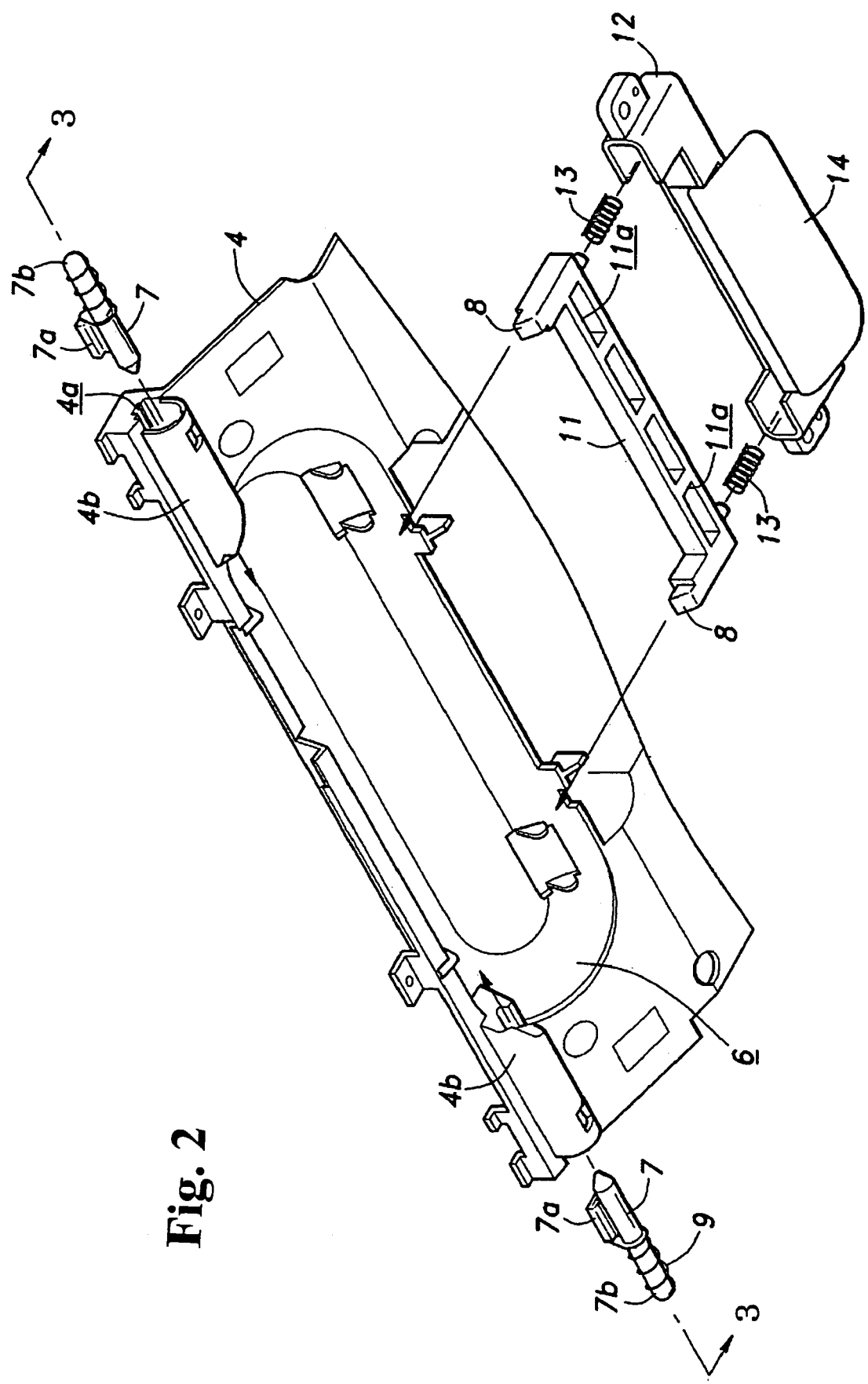
FIG. 2 is an exploded perspective view showing the remote control unit storage device.

The overhead consol 2 is formed of a metal plate fixed to a frame of the ceiling of the compartment and a plastic cover covering an interior of the compartment. As shown in FIG. 2, a plastic casing 4 is fixed to the metal plate with screws. The casing 4 is provided with a supporting shaft (not shown) for supporting the TV monitor 3 to be rotatable and a fixing portion (not shown) for fixing the TV monitor 3 at the storage position.

Figure 3:
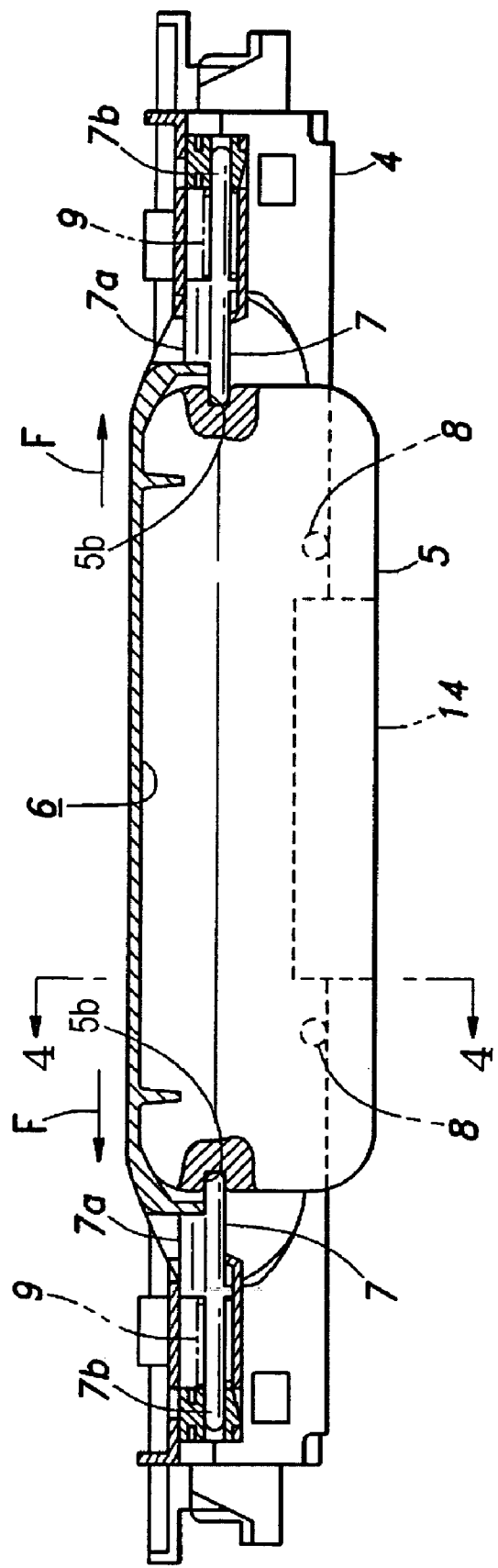
FIG. 3 is a sectional view taken along line 3-3 in FIG. 2 showing the remote control unit storage device in a state that a remote control unit is stored therein.
Figure 4:
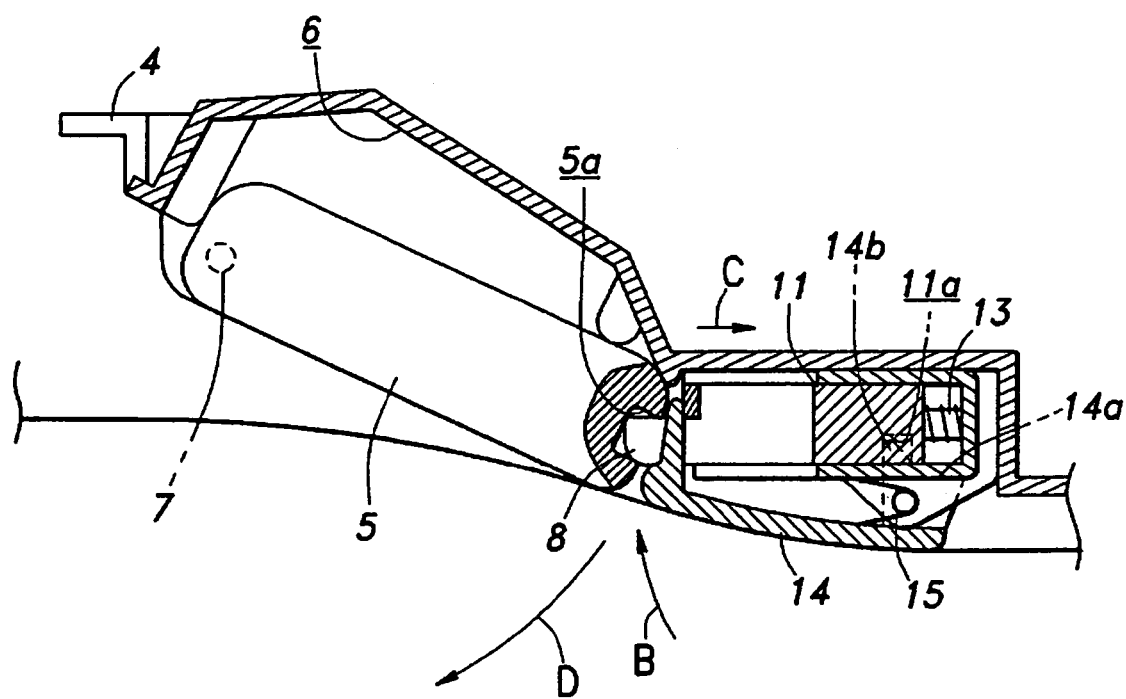
FIG. 4 is a sectional view taken along line 4-4 in FIG. 3 showing an essential portion of the remote control unit storage device.

As shown in FIGS. 3 and 4, the casing 4 is provided with a recess portion 6 at a rear side of the compartment for storing a remote control unit 5. The recess portion 6 has a bottom portion at a side of the ceiling. A pair of supporting shafts 7 projecting coaxially toward each other is formed at a front end of the recess portion 6 in the casing 4 viewed from a passenger in a rear seat. A pair of engaging claws 8 projecting in parallel from a rear wall into the recess portion 6 is formed at a rear end of the recess portion 6. The supporting shafts 7 have pointed round ends.

As shown in FIG. 4, the remote control unit 5 has a pair of engaging holes 5a at one end thereof at positions corresponding to the engaging claws 8 when the remote control unit 5 is stored in the recess portion 6. In addition, as shown in FIG. 3, the remote control unit 5 also has a pair of supporting holes 5b at the other end thereof at positions corresponding to the supporting shafts 7 when the remote control unit 5 is stored in the recess portion 6.

In a supporting unit in the embodiment, each of the supporting shafts 7 is integrally provided with a guide portion 7a to be guided along a guide groove 4a formed in the casing 4, and a projecting shaft 7b for disposing a coil spring 9 urging the supporting shaft 7 in a direction that the supporting shaft 7 projects outwardly. The casing 4 is provided with supporting portions 4b with a cylindrical shape for supporting the supporting shafts 7 to move reciprocally in an axial direction. The coil springs 9 are disposed between block members disposed in the supporting portions 4b and the guide portions 7a.

When the supporting shafts 7 are assembled, the supporting shafts 7 are retained coaxially in the supporting portions 4b. The supporting shafts 7 are urged by the coil springs 9, and the guide portions 7a of the supporting shafts 7 abut against stoppers formed on the casing 4, thereby adjusting a projecting length of the supporting shafts 7. In the embodiment, both of the supporting shafts 7 are arranged to freely project, and just one of the supporting shafts 7 may be arranged to freely project.

In an engaging and releasing unit in the embodiment, the engaging claws 8 are formed at parallel portions of a U shaped member 11 having a flat U shape. The U shaped member 11 is retained in a guide case 12 formed of a plastic and having a U flat shape, so that the U shaped member 11 freely moves reciprocally in a direction that the engaging claws 8 protrude. The guide case 12 is fixed to the casing 4 with screws. Coil springs 13 are disposed between a rear wall of the guide case 12 and portions of the U shaped member 11 opposite to the engaging claws 8 for urging the U shaped member 11 in the direction that the engaging claws 8 protrude.

A release lever 14 is disposed in the guide case 12 at a middle of a bar member thereof extending laterally. The release lever 14 is supported on a rib formed on an outer surface of the guide case 12 at a rear end of the release lever 14 viewed from the recess portion 6, so that a front end of the release lever 14 rotates in an arrow direction B and an opposite direction in FIG. 4. A torsion coil spring 15 is disposed between the release lever 14 and the guide case 12 at the supporting portion for urging the release lever 14 in the direction opposite to the arrow direction B. The release lever 14 is provided with a stopper 14a for positioning the release lever 14 against an urging force of the torsion coil spring 15, and a projection 14b for inserting a recess portion 11a formed in the U shaped member 11. The structure descried above constitutes the engaging and releasing unit in the embodiment.

With the remote control unit storage device, as shown in FIGS. 3 and 4, the remote control unit 5 is stored and fixed in the recess portion 6. In this state, the supporting shafts 7 are inserted into the supporting holes 5b, and the engaging claws 8 are inserted into the engaging holes 5a in the remote control unit 5. Accordingly, the remote control unit 5 is supported at four points.

In use, when the release lever 14 is pushed in the arrow direction B in FIG. 4, the projection 14b rotates around the supporting portion of the release lever 14 in the arrow direction B. The projection 14b engages the recess portion 11a, so that the U shaped member 11 moves in an arrow direction C, thereby releasing the engaging claws 8 from the engaging holes 5a. Accordingly, the remote control unit 5 rotates around the supporting shafts 7 in a direction D in FIG. 4, so that the remote control unit 5 hangs downwardly in a state supported by the supporting shafts 7.

Figure 5:
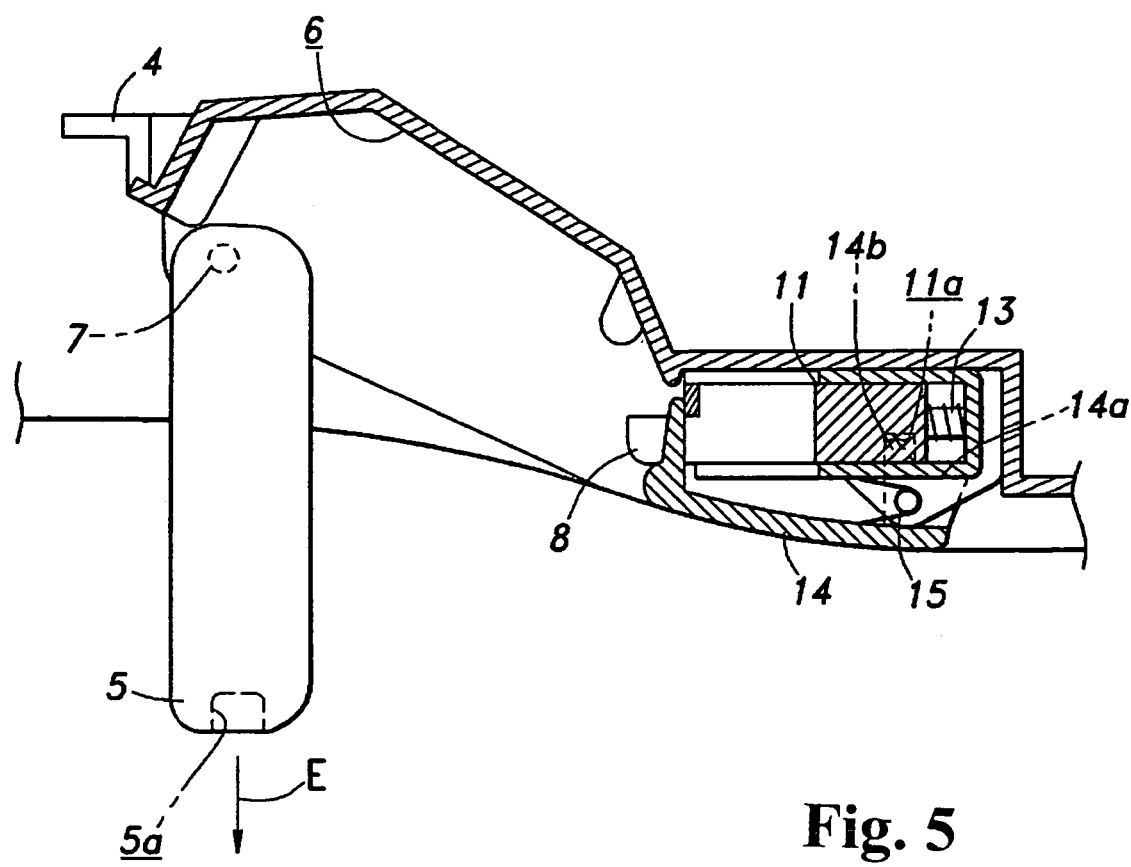
FIG. 5 is a sectional view corresponding to FIG. 4 showing the remote control unit storage device in a state that the remote control unit is released.

The supporting shafts 7 have the pointed round ends. Accordingly, when the remote control unit 5 is pulled downwardly from the state shown in FIG. 5, the supporting shafts 7 move in an arrow direction F in FIG. 3 while inclined surface of the round ends are guided. As a result, the supporting shafts 7 are released from the remote control unit 5 (supporting holes 5b), so that a passenger can operate the remote control unit 5 in hand.

When the remote control unit 5 is removed from the recess portion 6, the supporting shafts 7 and the engaging claws 8 are elastically urged and project. When the remote control unit 5 is stored in the recess portion 6, the operation is performed in a reversed order relative to the operation described above. That is, when the remote control unit 5 is pushed up in a direction opposite to an arrow direction E in FIG. 5, the supporting shafts 7 retract along a curved surface of the remote control unit 5. The supporting shafts 7 elastically enter the supporting hole 5b upon aligning the same. When a free end (lower end) of the remote control unit 5 hanging downwardly is pushed up around the supporting shafts 7 in a direction opposite to the arrow direction D in FIG. 4, the engaging claws 8 retract along a curved surface of the remote control unit 5. The engaging claws 8 elastically enter the engaging holes 5a upon aligning the same. Accordingly, the remote control unit 5 is stored and fixed to the recess portion 6.

In the remote control unit storage device in the embodiment, it is easy to attach the remote control unit 5. The remote control unit 5 is fixed to the overhead consol 2 at the ceiling of the compartment. Accordingly, when an occupant gets in the compartment, the occupant does not contact the remote control unit 5. Even when the occupant contacts the remote control unit 5 and the engaging claws 8 are released from the engaging holes 5a, the supporting shafts 7 support the supporting holes 5b, so that the remote control unit 5 does not fall off.

In the embodiment, the supporting shafts 7 are arranged so that both of the supporting shafts 7 move reciprocally. One of the supporting shafts 7 may be fixed and the other one of the supporting shafts 7 may be movable. In this case, the one of the supporting shafts 7 is arranged to be movable, so that the remote control unit 5 can move for a specific distance in the axial direction of the one of the supporting shafts 7. A gap is formed between the remote control unit 5 and the recess portion 6. The specific distance is set such that the other of the supporting shafts 7 can pull out the corresponding supporting hole 5b.

The disclosure of Japanese Patent Application No. 2004-123374 filed on Apr. 19, 2004 is incorporated in the application.

While the invention has been explained with reference to the specific embodiments of the invention, the explanation is illustrative and the invention is limited only by the appended claims.

What is claimed is:

1. A control unit storage device, comprising:
a storage member having a recess portion for retaining a control unit therein and having an opening facing downwardly, an engaging and releasing unit attached to the storage member adjacent to the recess portion for engaging one end of the control unit and releasing the one end from an engagement state, and a supporting unit formed in the storage member adjacent to the recess portion for supporting the other end of the control unit so that the control unit does not fall from the recess portion when the engaging and releasing unit releases the one end of the remote control unit from the engagement state;

wherein said engaging and releasing unit includes a guide case, U shaped member slidably situated in the guide case and having claws formed at tips of parallel portions of the U shaped member for engaging the control unit, a spring situated between the guide case and the U shaped member for urging the U shaped member in the guide case in a direction that the claws protrude from the guide case, and a release lever situated adjacent to the guide case for pushing the U shaped member in a direction opposite to the direction that the claws protrude when the control unit is released.

2. A control unit storage device according to claim 1, wherein said supporting unit includes a pair of supporting shafts disposed in the storage member for entering supporting holes disposed in the other end of the control unit, and an urging device for urging at least one of the supporting shafts in an axial direction so that the at least one of the supporting shafts moves reciprocally and projects outwardly.

3. A control unit storage device according to claim 2, wherein said at least one of said supporting shafts has a pointed round end.

4. A control unit storage device according to claim 1, wherein said storage member having said recess portion is integrally formed with an overhead consol with a TV monitor.

5. A control unit storage device according to claim 4, wherein said storage member is formed in a ceiling of a compartment of a vehicle.

6. A control unit storage device according to claim 1, wherein said guide case is formed of a plastic and has a U flat shape.

7. A control unit storage device according to claim 6, wherein said engaging and releasing unit further includes another spring attached to the release lever to move the release lever in a direction away from the U shaped member, and the release lever is arranged pivotally around a shaft thereof.

8. A combination of the control unit storage device according to claim 2 and the control unit, wherein said control unit includes a pair of engaging holes at one end for engaging the claws and a pair of supporting holes at the other end for engaging the supporting shafts so that when the release lever is pushed in a condition that the control unit is retained in the control unit storage device, one side of the control unit is released and is rotated around the supporting shafts while the other side of the control unit is supported by the supporting shafts.

* * * * *